US010722992B2

(12) United States Patent
Wada

(10) Patent No.: US 10,722,992 B2
(45) Date of Patent: Jul. 28, 2020

(54) WORKPIECE PLACEMENT SYSTEM FOR PLACING WORKPIECE IN CONTAINMENT AREA OR ON JIG

(71) Applicant: FANUC CORPORATION, Yamanashi (JP)

(72) Inventor: Jun Wada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 86 days.

(21) Appl. No.: 16/174,287

(22) Filed: Oct. 30, 2018

(65) Prior Publication Data

US 2019/0160617 A1 May 30, 2019

(30) Foreign Application Priority Data

Nov. 24, 2017 (JP) ................. 2017-226157

(51) Int. Cl.
*B25J 9/16* (2006.01)
*B23Q 7/04* (2006.01)
*B25J 13/06* (2006.01)

(52) U.S. Cl.
CPC ............ *B23Q 7/046* (2013.01); *B25J 9/1671* (2013.01); *B25J 9/1687* (2013.01); *B25J 9/1697* (2013.01); *B25J 13/06* (2013.01); *G05B 2219/39107* (2013.01); *G05B 2219/39536* (2013.01)

(58) Field of Classification Search
CPC ....... B25J 9/1697; B25J 9/1687; B65B 35/56; B65B 5/10
See application file for complete search history.

(56) References Cited

U.S. PATENT DOCUMENTS

| 5,908,283 | A | * | 6/1999 | Huang | .................. | B65G 47/90 |
| | | | | | | 414/21 |
| 9,102,055 | B1 | * | 8/2015 | Konolige | ................. | B25J 9/163 |
| 10,549,928 | B1 | * | 2/2020 | Chavez | ................. | B25J 9/1697 |
| 2016/0229061 | A1 | * | 8/2016 | Takizawa | ............... | B25J 9/1697 |

(Continued)

FOREIGN PATENT DOCUMENTS

| JP | S61-33880 A | 2/1986 |
| JP | S62-251811 A | 11/1987 |

(Continued)

*Primary Examiner* — Timothy R Waggoner
(74) *Attorney, Agent, or Firm* — Hauptman Ham, LLP

(57) ABSTRACT

A workpiece placement system includes a robot for placing a workpiece in a containment area or on a jig; a sensor for measuring a three-dimensional shape of the containment area or jig; a processor for performing a process to determine a workpiece placement position and a workpiece placement posture based on the three-dimensional shape; and a robot controller for controlling the robot based on the workpiece placement position and the workpiece placement posture. The processor obtains a workpiece shape of the workpiece to be placed; retrieves workpiece placement postures chosen by a user; calculates a vacant area of the containment area or jig based on the three-dimensional shape; calculates workpiece placeable areas that satisfy the workpiece shape and the workpiece placement posture in the vacant area; and determines the workpiece placement position and the workpiece placement posture suitable for placement of the workpiece in the workpiece placeable areas.

9 Claims, 19 Drawing Sheets

(56) References Cited

U.S. PATENT DOCUMENTS

2016/0272354 A1* 9/2016 Nammoto .............. B25J 9/0087
2017/0182665 A1* 6/2017 Okuyama .............. B25J 9/1687

FOREIGN PATENT DOCUMENTS

| JP | H2-17577 A | 1/1990 |
| JP | H3-243532 A | 10/1991 |
| JP | H4-167104 A | 6/1992 |
| JP | H5-221526 A | 8/1993 |
| JP | H6-142881 A | 5/1994 |
| JP | H11-59909 A | 3/1999 |
| JP | 2001-278409 A | 10/2001 |
| JP | 2012-30320 A | 2/2012 |
| JP | 2015-44274 A | 3/2015 |
| JP | 2015-182145 A | 10/2015 |
| JP | 2016-144841 A | 8/2016 |
| JP | 2016-196052 A | 11/2016 |
| WO | 2017/149616 A1 | 9/2017 |

* cited by examiner

WORKPIECE PLACEMENT SYSTEM FOR PLACING WORKPIECE IN CONTAINMENT AREA OR ON JIG

RELATED APPLICATIONS

The present application claims priority of Japanese Patent Application No. 2017-226157, filed on Nov. 24, 2017, the disclosure of which is hereby incorporated by reference herein in its entirety.

BACKGROUND OF THE INVENTION

1. Field of the Invention

The present invention relates to a workpiece placement system, and more specifically relates to a workpiece placement system that places one or more workpieces in one or more containment areas or on one or more jigs.

2. Description of Related Art

There are workpiece placement systems in which robots place workpieces in containment areas or on jigs. The robot is often required of the task of lifting a workpiece out of a containment area, and the task of placing the workpiece in a predetermined position of a jig. Thus, the robot often moves to a previously taught position, while grasping the workpiece, and places the workpiece in the position. As technologies relating to the present application, for example, the following documents are publicly known. Japanese Unexamined Patent Publication (Kokai) No. 2001-278409 discloses a sample delivery and collection system. In the system, an arrangement of sample racks in a sample containment area is detected by photodetectors, and whether there is vacant space in the sample containment area is determined. When there is vacant space, a robot disposes a sample rack in the vacant space of the sample containment area. Japanese Unexamined Patent Publication (Kokai) No. 2012-030320 discloses an operation system that performs an assembly operation in an assembly area. In the operation system, vacant space information on a tray is recognized, and vacant space of the tray is used as a place to put an intermediate assembly.

SUMMARY OF THE INVENTION

When workpiece shape data is unknown (for example, when a plurality of types of workpieces are handled), where to place a workpiece cannot be taught in advance. For lack of the workpiece shape data, the workpiece cannot always be appropriately placed in a containment area or on a jig. Furthermore, even if the workpiece shape data is known, when a placed workpiece is displaced for any reason, a position to place another workpiece afterward may also be displaced. In such a case, the workpiece cannot always be appropriately placed.

When the position or shape of a containment area or jig is unknown, in the same manner, a workpiece cannot always be appropriately placed. In spite of that a workpiece is already present in the containment area or jig, or that the containment area or jig is not suitable to place any workpiece, a workpiece may be placed there. Furthermore, there is also a demand for a function that a user can flexibly choose a workpiece placement posture.

Accordingly, a technology to place a workpiece in a desired posture without any deviation, irrespective of the shape of the workpiece and the shape of a containment area or jig, is required.

An aspect of the present disclosure provides a workpiece placement system that places one or more workpieces in one or more containment areas or on one or more jigs. The workpiece placement system includes a robot for placing the workpiece in the containment area or on the jig; a sensor for measuring a three-dimensional shape of the containment area or jig; a processor for performing a process to determine a workpiece placement position and a workpiece placement posture based on the three-dimensional shape; and a robot controller for controlling the robot based on the workpiece placement position and the workpiece placement posture. The processor includes a workpiece shape obtainment section for obtaining a workpiece shape of the workpiece to be placed; a placement posture retrieval section for retrieving one or more types of workpiece placement postures chosen by a user; a vacant area calculation section for calculating a vacant area of the containment area or jig based on the three-dimensional shape; a workpiece placeable area calculation section for calculating one or more workpiece placeable areas that satisfy the workpiece shape and the workpiece placement posture in the vacant area; and a position and posture determination section for determining the workpiece placement position and the workpiece placement posture that are suitable for placement of the workpiece in the one or more workpiece placeable areas.

DETAILED DESCRIPTION OF THE INVENTION

Figure 1:
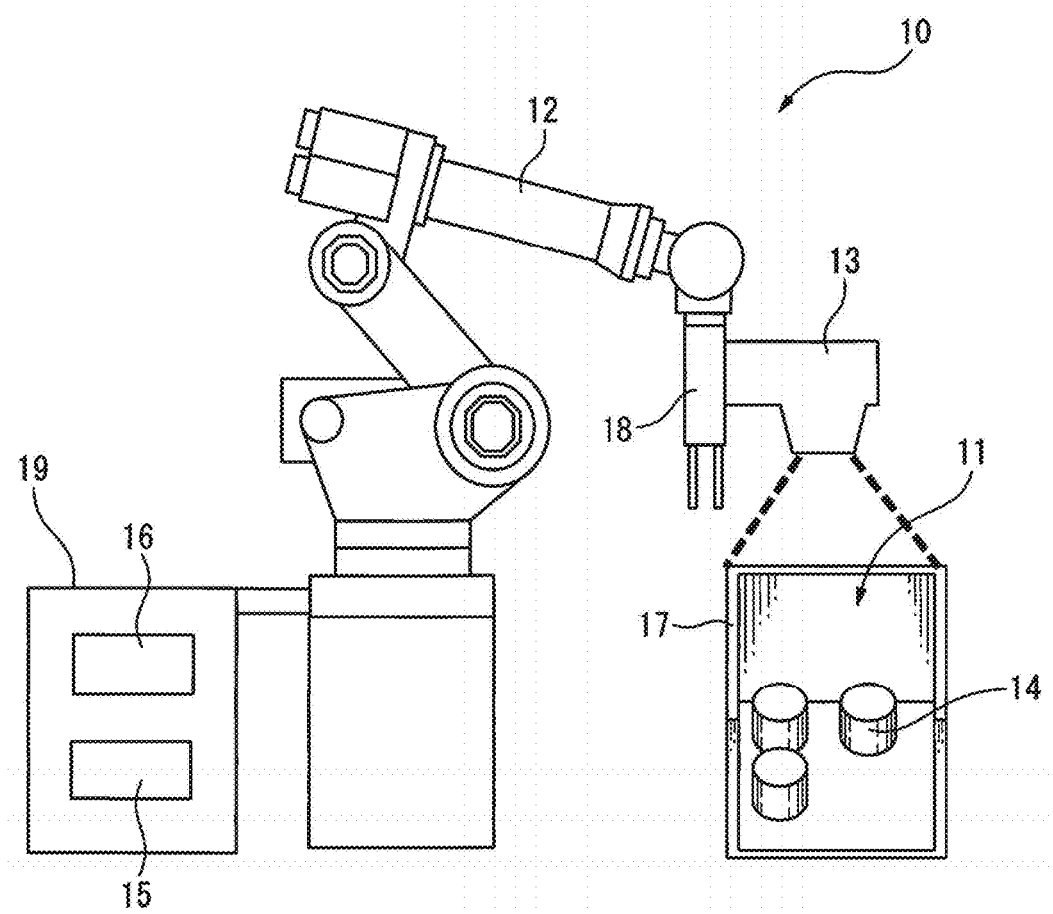
FIG. 1 is a side view showing the schematic structure of a workpiece placement system according to an embodiment.

Embodiments of the present disclosure will be described below in detail with reference to the attached drawings. In the drawings, the same or similar components are indicated with the same or similar reference numerals. The following embodiments do not limit the technical scope and the meaning of terms of the invention described in claims.

FIG. 1 is a side view showing the schematic structure of a workpiece placement system 10 according to an embodiment. The workpiece placement system 10 places a workpiece 14 in a containment area 11. The workpiece placement system 10 includes a robot 12 for placing the workpiece 14 in the containment area 11, a sensor 13 for measuring a three-dimensional shape of the containment area 11, a processor 15 for performing a process to determine a workpiece placement position and a workpiece placement posture based on the three-dimensional shape of the containment area 11, and a robot controller 16 for controlling the robot 12 based on the workpiece placement position and the workpiece placement posture.

The containment area 11 may be a container 17 having an opening in a perpendicular direction, or a container shelf (not shown) having an opening in a horizontal direction. In FIG. 1, a front side wall of the container 17 is not illustrated, in order to make workpieces 14 visible. The containment area 11 contains one or more workpieces. One or more containment areas 11 may be present.

The robot 12 is a well-known six-axis manipulator having a hand 18 for grasping a workpiece. The hand 18 is provided with the sensor 13. The sensor 13 is a well-known visual sensor having a stereo camera. As the visual sensor, for example, Kinect (trademark) can be used. In Kinect, while a structured pattern is projected to the workpiece 14 by an infrared laser, two infrared cameras capture images of the workpiece 14, and thereby a three-dimensional shape of the workpiece 14 is obtained by a triangulation technique. Therefore, even if the containment area 11 is dark, the three-dimensional shape of the containment area 11 can be obtained with high accuracy.

The processor 15 is provided in a robot control device 19. The processor 15 includes a well-known CPU, an ASIC, an FPGA, etc. In an alternative embodiment, the processor 15 may be provided outside the robot control device 19, and may be provided in, for example, a robot teaching device described later. The robot controller 16 is provided in the robot control device 19. The robot controller 16 includes a well-known control circuit that performs position control, speed control, etc., of servomotors to operate the robot 12.

Figure 2:
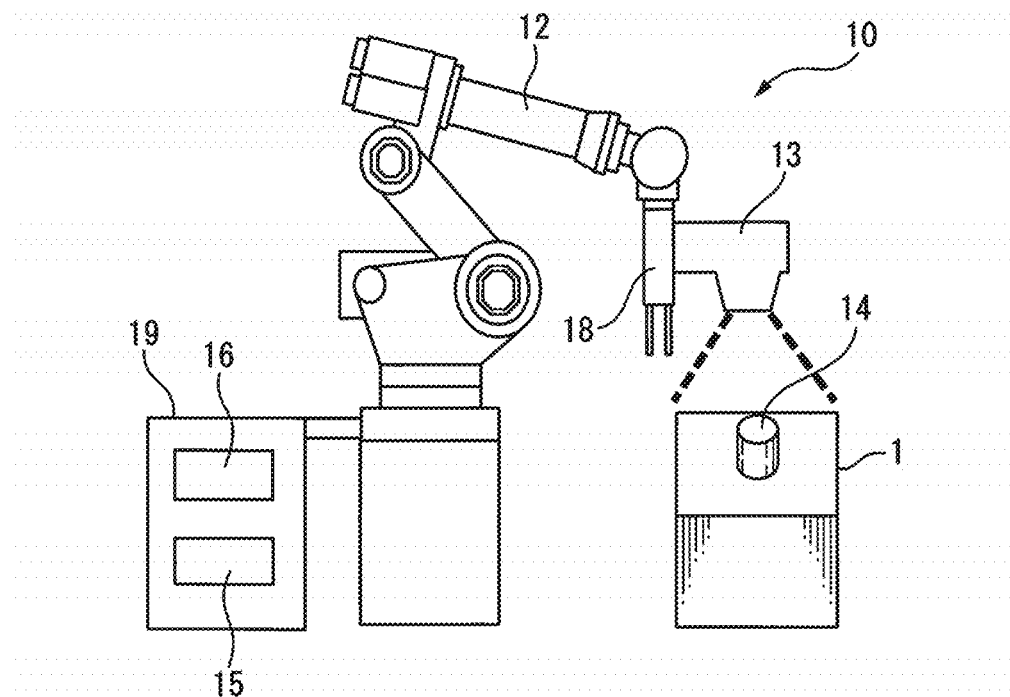
FIG. 2 is a drawing showing a method for obtaining a workpiece shape according to the embodiment.

FIG. 2 is a drawing showing a method for obtaining a workpiece shape according to the embodiment. The workpiece shape of the workpiece 14 is preferably obtained by the sensor 13 in advance before placing the workpiece 14 in the containment area 11. The workpiece 14 to be placed may be disposed on, for example, an imaging table 1. The workpiece shape is stored in a storage unit (see FIG. 11), as an initial value.

Figure 3:
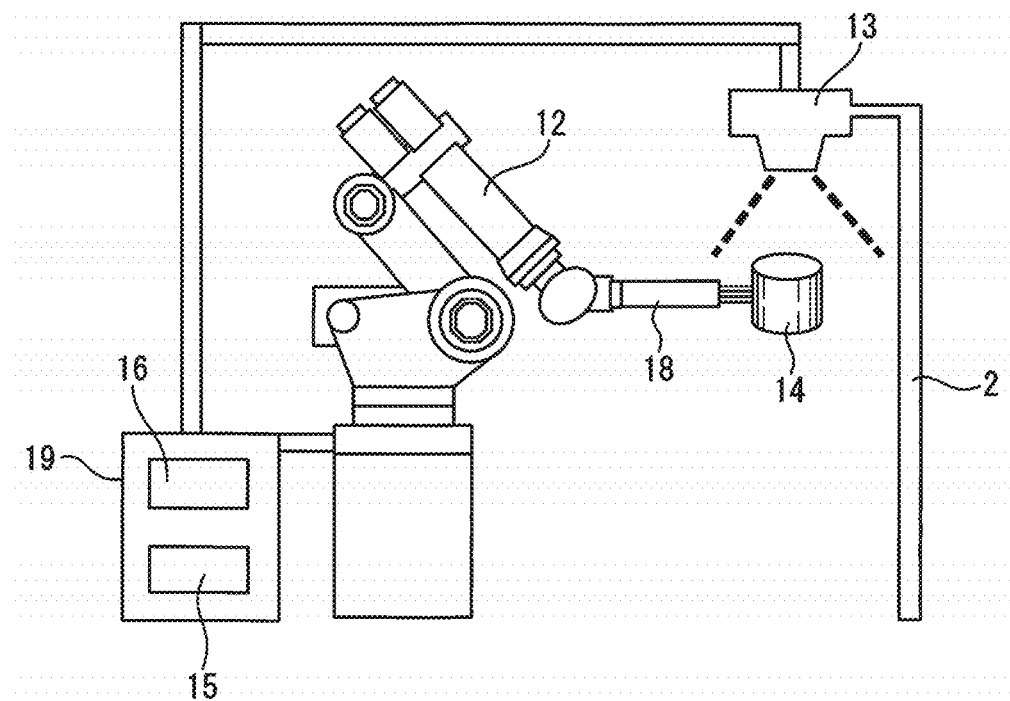
FIG. 3 is a drawing showing a method for obtaining a workpiece shape according to an alternative embodiment.

FIG. 3 is a drawing showing a method for obtaining a workpiece shape according to an alternative embodiment. The workpiece shape of the workpiece 14 may be obtained by the sensor 13 during placing the workpiece 14 in the containment area 11. The sensor 13 may be provided in the hand 18 of the robot 12, but may be provided in another position, for example, in a structural column 2.

Figure 4:
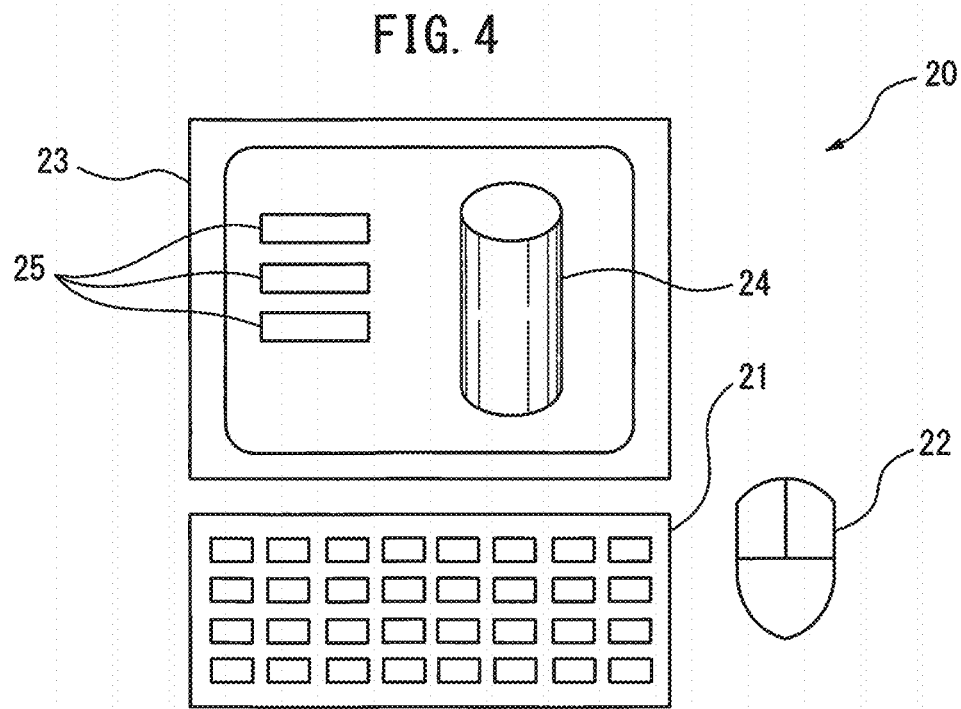
FIG. 4 is a drawing of a robot teaching device according to the embodiment.

FIG. 4 is a drawing of a robot teaching device 20 according to the embodiment. The robot teaching device 20 is a well-known computer device, which includes an input unit having a keyboard 21 and a mouse 22, and a display unit having a monitor 23. The robot teaching device 20 displays a workpiece shape 24 obtained by the sensor 13 on the display unit. The robot teaching device 20 has the function of making a user choose a workpiece placement posture. The display unit displays alternatives 25, to make the user choose the workpiece placement posture.

The workpiece placement posture alternatives 25 preferably include the following items, etc.

(1) A workpiece is placed such that the number or size of contact points, contact lines, and contact surfaces of the workpiece in a containment area is maximized.

(2) A workpiece is placed such that a protruding portion of a workpiece shape is oriented upward.

(3) A workpiece is placed such that a flat portion of a workpiece shape is oriented upward.

(4) A workpiece is placed such that a flat portion of a workpiece shape is oriented downward.

(5) A workpiece is placed such that a major axis of a workpiece shape is oriented in a perpendicular direction.

(6) A workpiece is placed such that a minor axis of a workpiece shape is oriented in a perpendicular direction.

The above-described processor 15 (see FIGS. 1 to 3) calculates a workpiece placement posture based on the alternative 25 chosen by the user. The calculated workpiece placement posture may include one or more workpiece placement postures per workpiece. The use of the alternatives 25 eliminates the need for obtaining the workpiece shape in advance by the sensor 13.

Figure 5A:
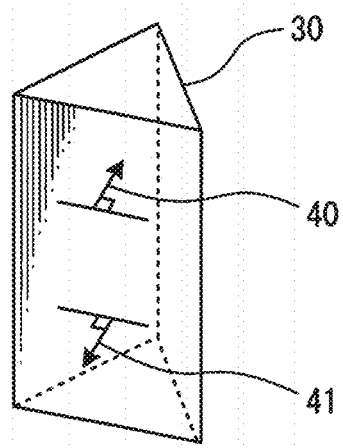
FIG. 5A is a perspective view showing an example of the workpiece shape according to the embodiment.
Figure 5B:
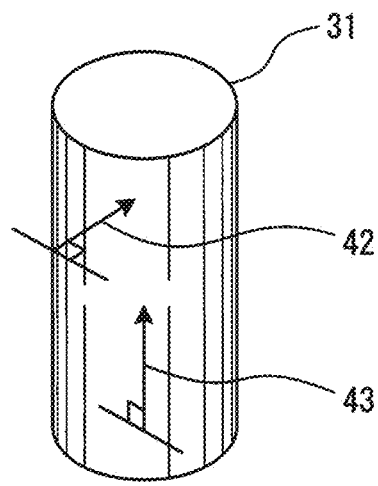
FIG. 5B is a perspective view showing an example of the workpiece shape according to the embodiment.
Figure 5C:
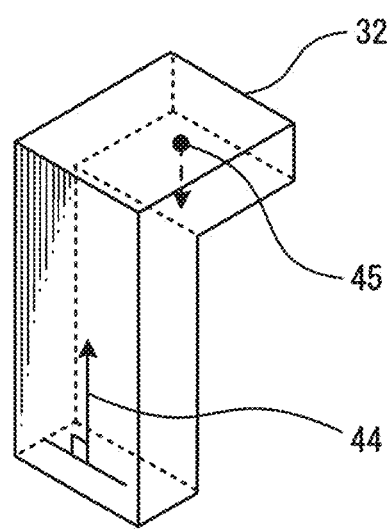
FIG. 5C is a perspective view showing an example of the workpiece shape according to the embodiment.

FIGS. 5A to 5C are perspective views showing examples of the workpiece shape according to the embodiment. A workpiece 30 is in the shape of a triangle prism, a workpiece 31 is in the shape of a cylinder, and a workpiece 32 is in the shape of the letter L, but not limited thereto, workpieces may be in complicated shapes, etc. Reference numerals 40 to 44 indicate workpiece placement postures (arrows indicate perpendicular directions) chosen by the user. The workpiece placement postures 40 to 44 may be directly chosen by the user based on the workpiece shape 24 disposed in virtual space, instead of using the alternatives 25 shown in FIG. 4. The directly chosen workpiece placement posture may include one or more workpiece placement postures per workpiece.

In FIG. 5C, reference numeral 45 indicates a workpiece barycenter position. As shown in FIG. 4, the workpiece barycenter position 45 may be directly chosen by the user based on the workpiece shape 24 disposed in the virtual space. When the workpiece 32 has a uniform density, the above-described processor 15 (see FIGS. 1 to 3) may calculate the workpiece barycenter position 45 from the workpiece shape. The workpiece placement postures and the workpiece barycenter position are stored in the storage unit (see FIG. 11), as initial values.

Figure 6A:
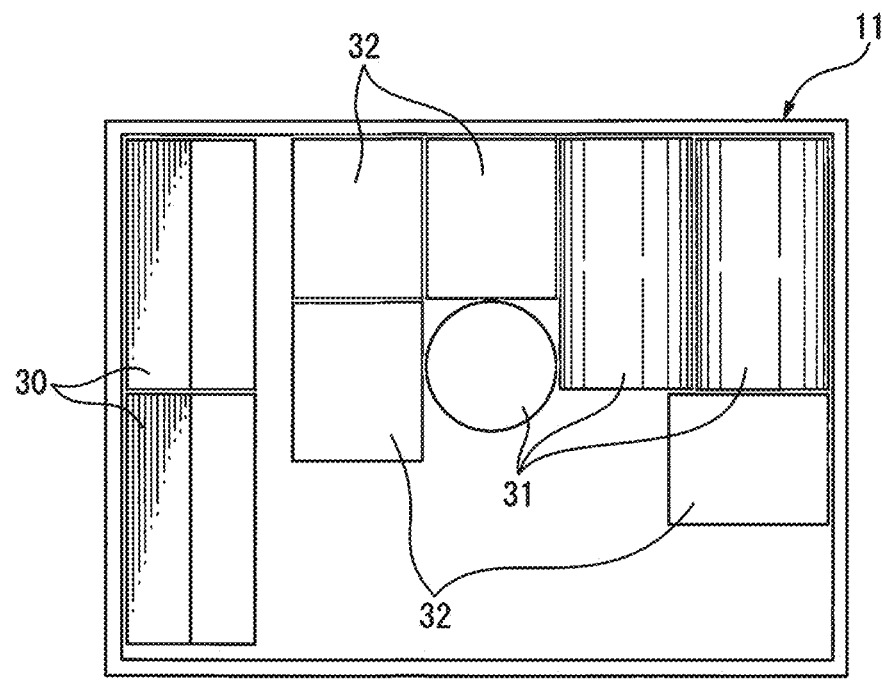
FIG. 6A is a plan view showing a containment area according to the embodiment.
Figure 6B:
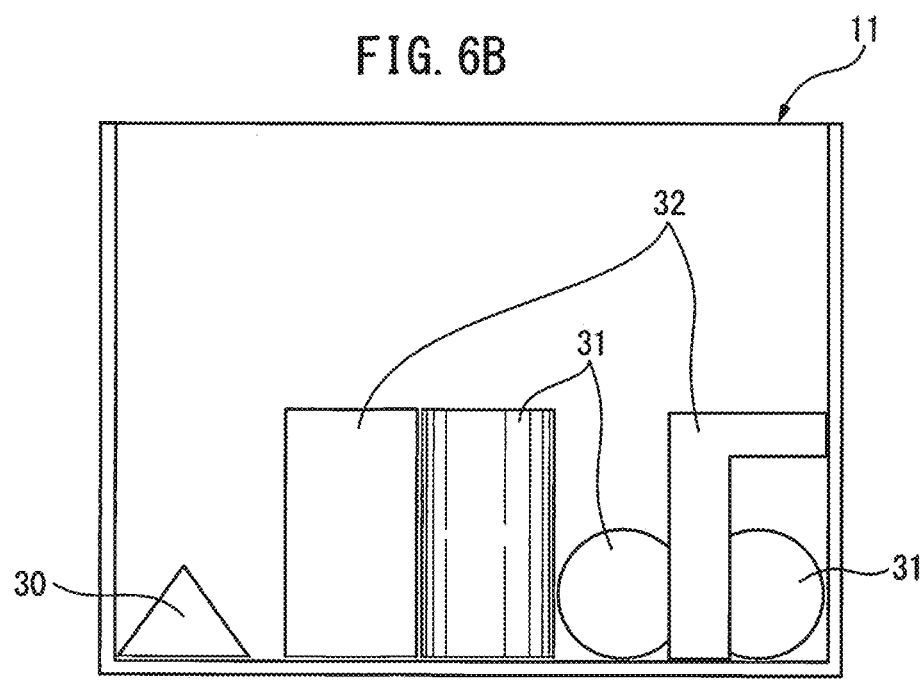
FIG. 6B is a side view showing the containment area according to the embodiment.

Next, a method for placing a workpiece according to the embodiment will be described. FIGS. 6A and 6B are a plan view and a side view, respectively, that show the containment area 11. By way of example, in a state that three types of workpieces 30 to 32 are already placed in the containment area 11, a cylindrical workpiece 31 is placed in the containment area 11 the workpiece placement posture 42 or 43 (see FIG. 5B) chosen by the user. First, the sensor 13 (see FIGS. 1 to 3) obtains the three-dimensional shape of the containment area 11 from above. Note that, although lower space of the workpieces 31 and 32 is illustrated in the side view of FIG. 6B, for the sake of simplicity of explanation, the obtained three-dimensional shape of the containment area 11 does not include the lower space.

Figure 7A:
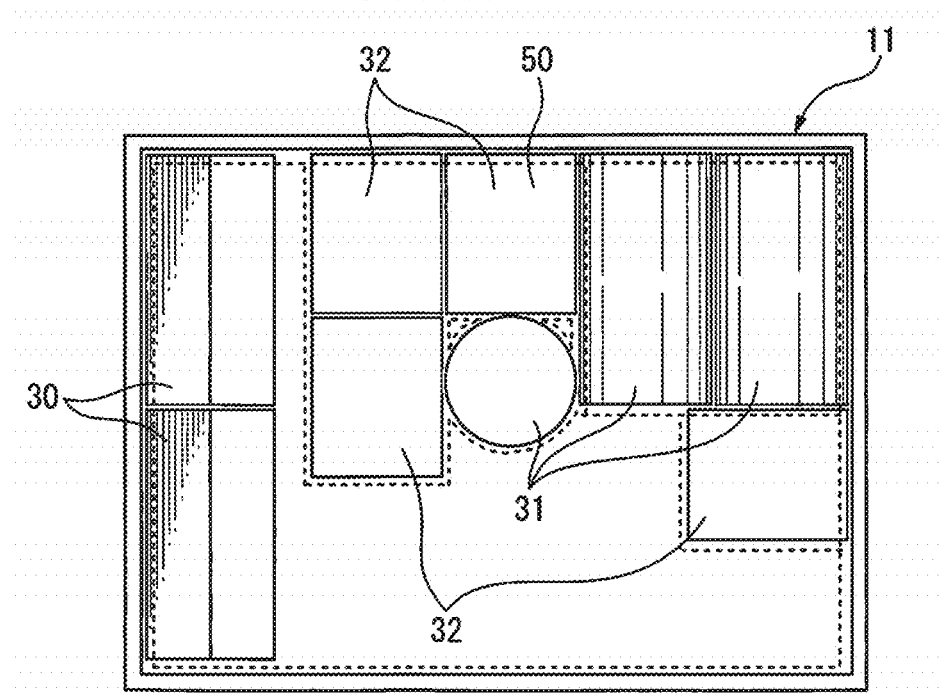
FIG. 7A is a plan view showing a vacant area of the containment area according to the embodiment.
Figure 7B:
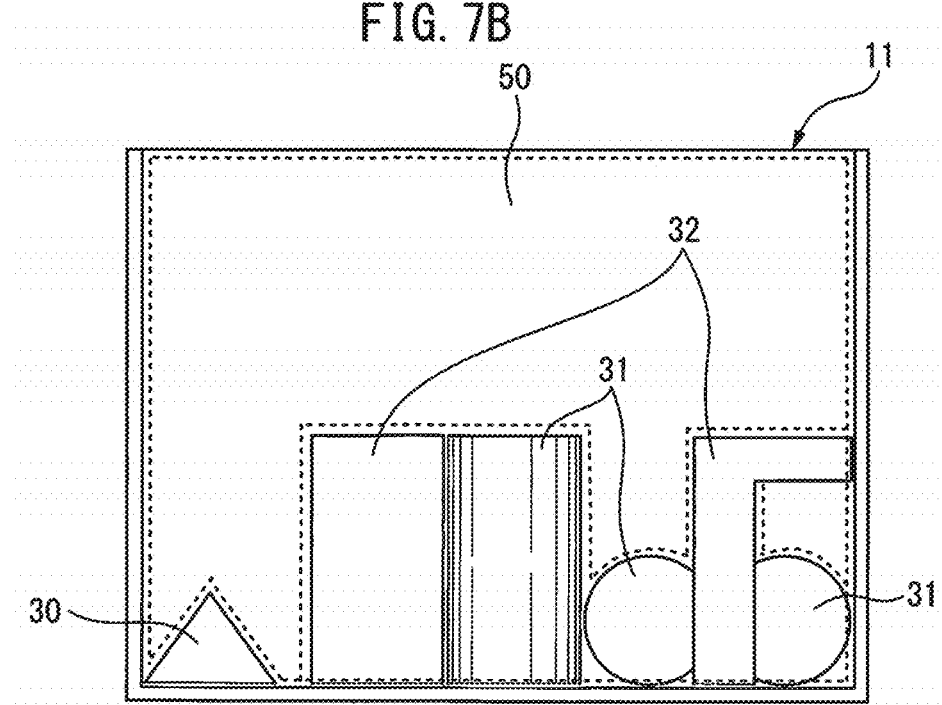
FIG. 7B is a side view showing the vacant area of the containment area according to the embodiment.

FIGS. 7A and 7B are a plan view and a side view, respectively, that show a vacant area 50 of the containment area according to the embodiment. After the three-dimensional shape of the containment area 11 is obtained, the vacant area 50 of the containment area 11 is calculated.

Figure 8A:
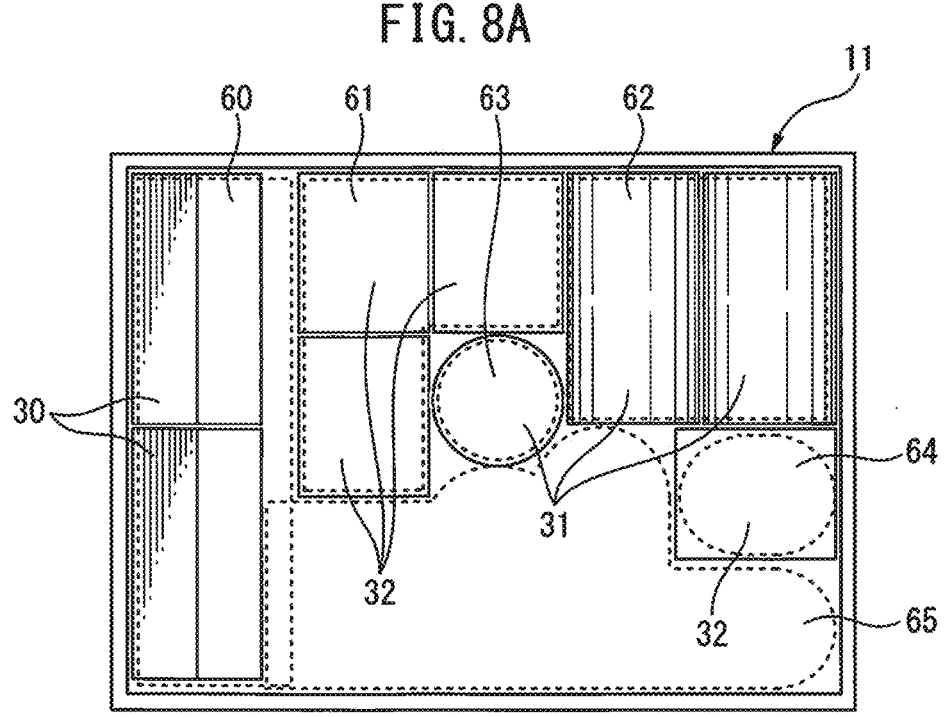
FIG. 8A is a plan view showing workpiece placeable areas according to the embodiment.
Figure 8B:
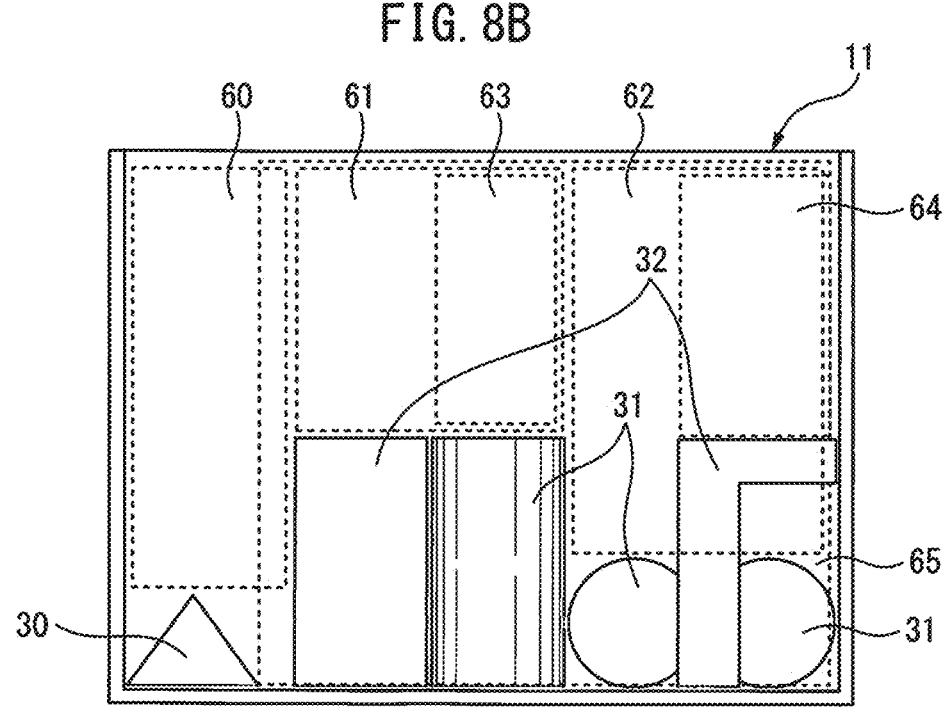
FIG. 8B is a side view showing the workpiece placeable areas according to the embodiment.

FIGS. 8A and 8B are a plan view and a side view, respectively, that show workpiece placeable areas 60 to 65 according to the embodiment. After the vacant area 50 is calculated, the workpiece placeable areas 60 to 65 in which the workpiece 31 can be placed are calculated in the vacant area 50. The workpiece placeable areas 60 to 65 are calculated as areas that satisfy the workpiece shape (i.e. cylinder, see FIG. 5B) of the workpiece 31 to be placed and the two types of workpiece placement postures 42 and 43 (i.e. lateral placement and vertical placement, see FIG. 5B) chosen by the user, in the vacant area 50.

A placement list that specifies correspondences between the calculated workpiece placeable areas 60 to 65 and the two types of workpiece placement postures 42 and 43 (i.e., lateral placement and vertical placement) chosen by the user may be generated. For example, the placement list includes:

(1) the workpiece placeable area 60→lateral placement and vertical placement
(2) the workpiece placeable area 61→lateral placement and vertical placement
(3) the workpiece placeable area 62→lateral placement and vertical placement
(4) the workpiece placeable area 63→vertical placement
(5) the workpiece placeable area 64→vertical placement
(6) the workpiece placeable area 65→lateral placement and vertical placement.

Figure 9A:
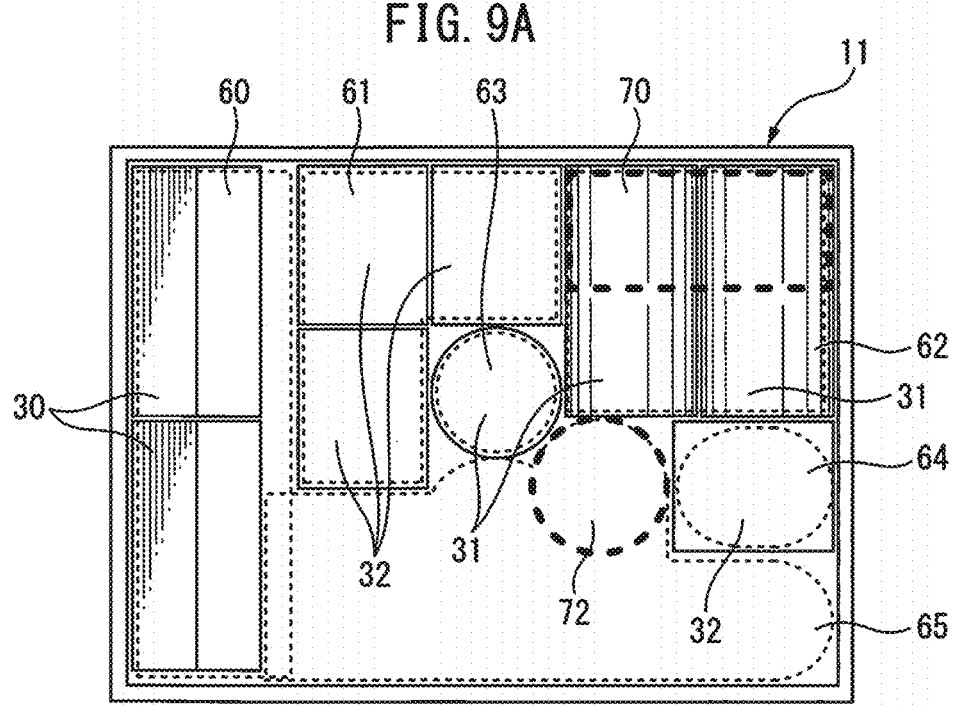
FIG. 9A is a plan view showing workpiece placement positions and workpiece placement postures according to the embodiment.
Figure 9B:
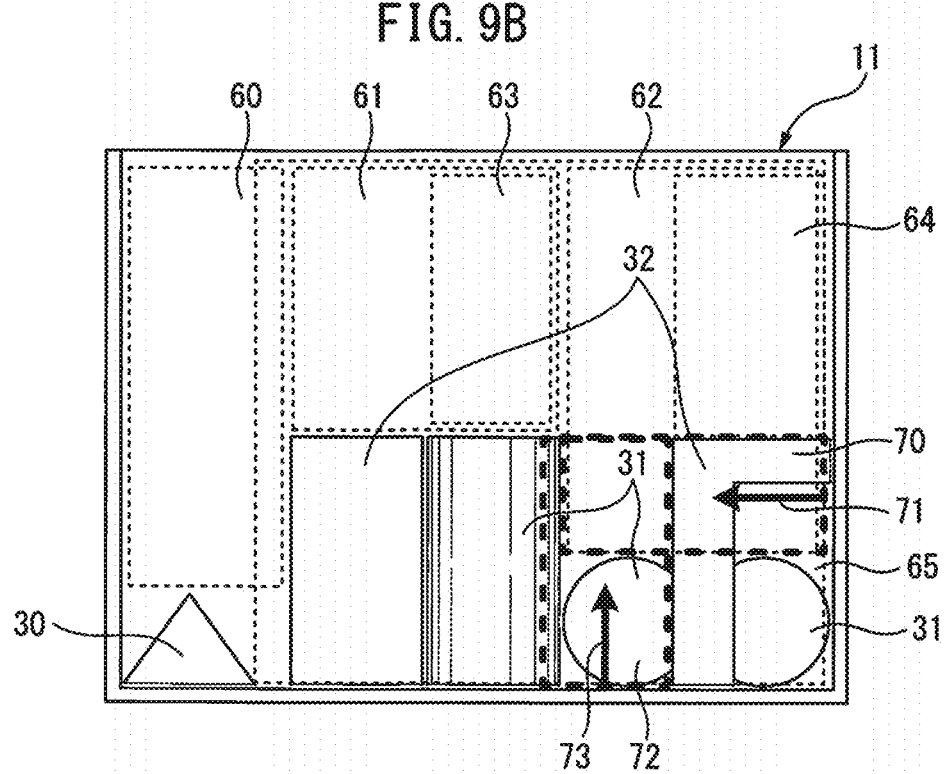
FIG. 9B is a side view showing the workpiece placement positions and the workpiece placement postures according to the embodiment.

FIGS. 9A and 9B are a plan view and a side view, respectively, that show workpiece placement positions and workpiece placement postures according to the embodiment. After the workpiece placeable areas 60 to 65 are calculated, the workpiece placement positions and the workpiece placement postures suitable for placement of workpiece 31 are determined in the workpiece placeable areas 60 to 63.

When the workpiece 31 is placed in a workpiece placement position 70 and a workpiece placement posture 71 (indicated by thick lines), the workpiece 31 contacts the two workpieces 31 on a lower side, an inner surface of the containment area 11, and the workpiece 32 on a left side, so the workpiece 31 makes contact at two contact points, one contact line, and two contact surfaces. On the other hand, when the workpiece 31 is placed in a workpiece placement position 72 and a workpiece placement posture 73 (indicated by thick lines), the workpiece 31 contacts a bottom surface of the containment area 11 on a lower side, the workpiece 31 on a left side, the workpiece 31 on a rear side, and the workpiece 32 on a right side, so the workpiece 31 makes contact at two contact lines and one contact surface. Accordingly, the workpiece placement position 70 and the workpiece placement posture 71 have a larger number or size of contact points, contact lines, and contact surfaces than the workpiece placement position 72 and the workpiece placement posture 73. The workpiece placement position 70 and the workpiece placement posture 71 have a maximum number or size of contact points, contact lines, and contact surfaces of the workpiece 31, in the workpiece placeable areas 60 to 65. Therefore, the workpiece placement position and the workpiece placement posture are determined to be a position indicated by reference numeral 70 and a posture indicated by reference numeral 71, respectively. Note that, when there are workpieces that are already placed, the workpiece placement position and the workpiece placement posture are preferably determined such that the workpiece 31 to be placed is placed in the closest position and posture to the workpieces 30 to 32 that are placed in advance. A priority in the number and size of contact points, contact lines, and contact surfaces of the workpiece 31 may be appropriately chosen by the user.

Figure 10A:
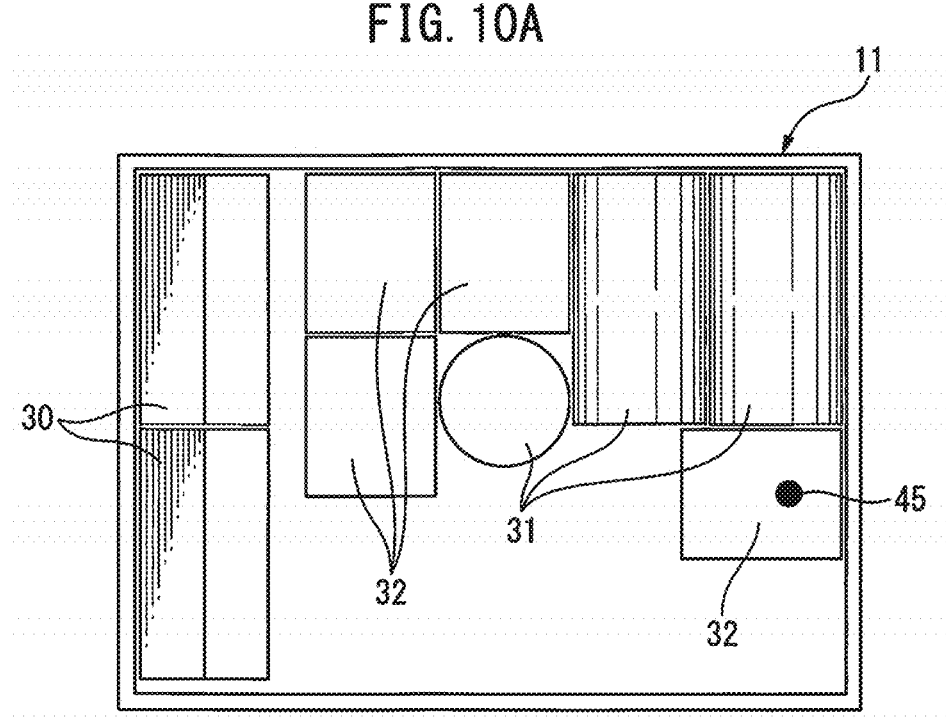
FIG. 10A is a plan view showing a workpiece barycenter position according to the embodiment.
Figure 10B:
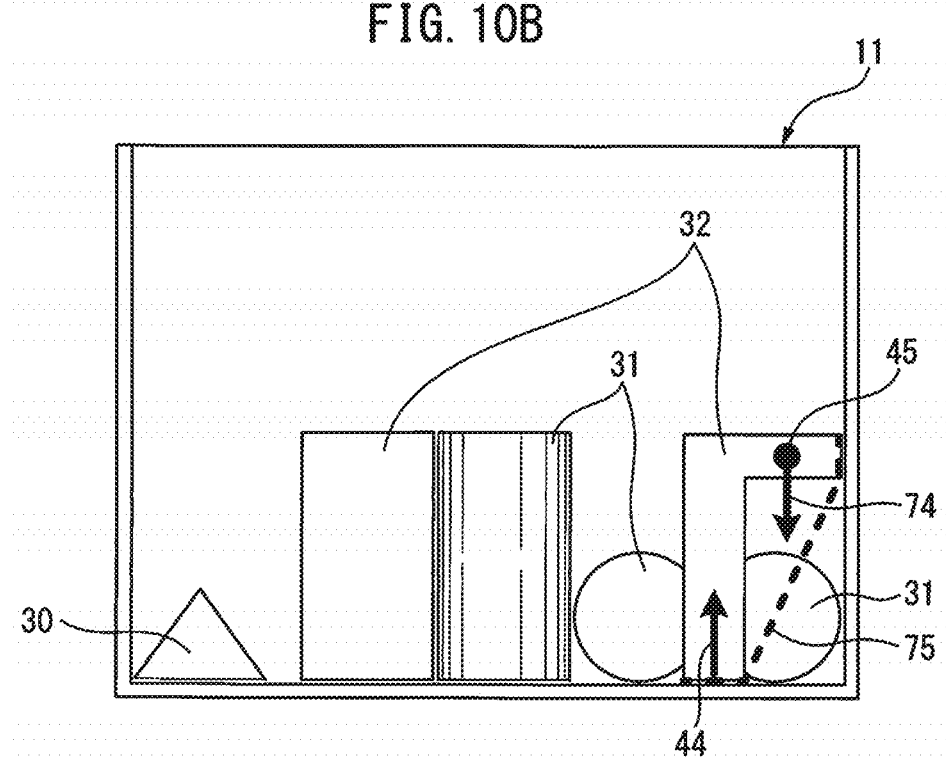
FIG. 10B is a side view showing the workpiece barycenter position according to the embodiment.

FIGS. 10A and 10B are a plan view and a side view, respectively, that show a workpiece barycenter position according to the embodiment. When a L-shaped workpiece 32 is placed in the containment area 11 in a workpiece placement posture 44 chosen by the user, there is apprehension that the workpiece 32 may topple over owing to a workpiece barycenter position 45. Accordingly, a workpiece placement position and a workpiece placement posture are preferably determined such that a vertical line 74 passing through the workpiece barycenter position 45 is within a contact area 75 formed by contact points, contact lines, and contact surfaces of the workpiece 32. The contact area 75 is defined as an area that encloses the contact points, the contact lines, and the contact surfaces. Therefore, the L-shaped workpiece 32 having the workpiece barycenter position 45 is placed in such a manner as to be supported by an inner surface of the containment area 11.

Figure 11:
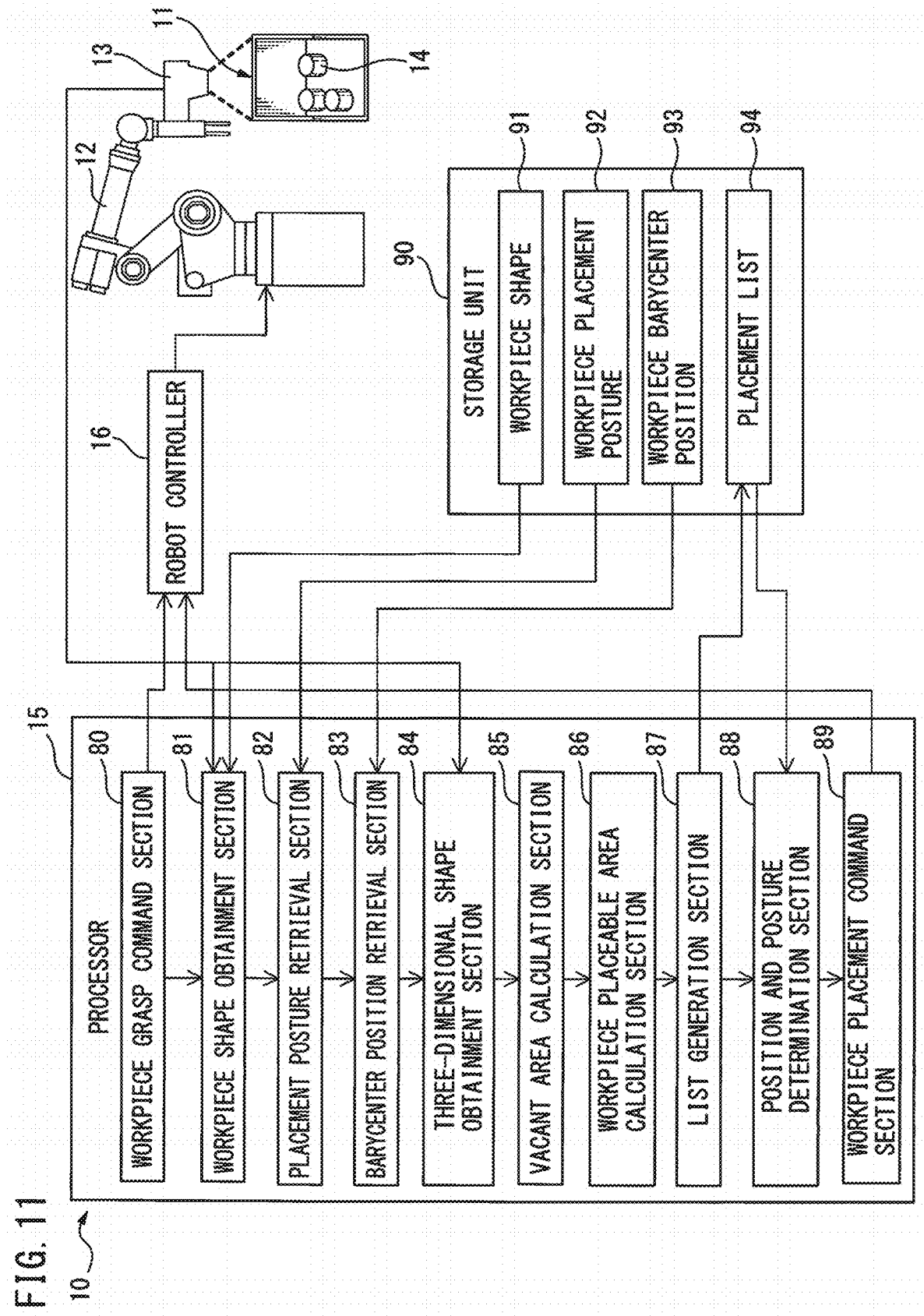
FIG. 11 is a block diagram showing the configuration of the workpiece placement system according to the embodiment.

FIG. 11 is a block diagram showing the configuration of the workpiece placement system 10 according to the embodiment. The workpiece placement system 10 includes the processor 15 that performs a process to determine a workpiece placement position and a workpiece placement posture based on a three-dimensional shape of the containment area 11, the robot controller 16 that controls the robot based on the workpiece placement position and the workpiece placement posture, and a storage unit 90 that stores various types of data. Components of the processor 15 are implemented as programs executed by the CPU, or as an integrated circuit such as the ASIC or the FPGA. The processor 15 includes a workpiece grasp command section 80 that commands the robot controller 16 to grasp a workpiece 14 to be placed, a workpiece shape obtainment section 81 for obtaining a workpiece shape 91 of the workpiece 14 to be placed from the sensor 13 or the storage unit 90, and a placement posture retrieval section 82 for retrieving one or more types of workpiece placement postures 92 chosen by a user. The processor 15 may further include a barycenter position retrieval section 83 for retrieving a workpiece barycenter position 93 chosen by the user.

The processor 15 further includes a three-dimensional shape obtainment section 84 for obtaining the three-dimensional shape of the containment area 11 from the sensor 13, a vacant area calculation section 85 for calculating a vacant area of the containment area 11 based on the three-dimensional shape of the containment area 11, and a workpiece placeable area calculation section 86 for calculating one or more workpiece placeable areas that satisfy the workpiece shape and the workpiece placement posture in the vacant area. The processor 15 may further include a list generation section 87 for generating a placement list 94 that specifies correspondences between the calculated one or more workpiece placeable areas and the one or more types of workpiece placement postures chosen by the user. The placement list 94 generated by the list generation section 87 is stored in the storage unit 90.

The processor 15 further includes a position and posture determination section 88 for determining a workpiece placement position and a workpiece placement posture suitable for placement of the workpiece, in the one or more workpiece placeable areas, and a workpiece placement command section 89 for commanding the robot controller 16 to place the workpiece 14 to be placed in the containment area 11 based on the determined workpiece placement position and workpiece placement posture. The position and posture determination section 88 determines the workpiece placement position and the workpiece placement posture such that the number or size of contact points, contact lines, and contact surfaces of the workpiece 14 to be placed is maximized in the workpiece placeable areas. The position and posture determination section 88 may further determine the workpiece placement position and the workpiece placement posture suitable for placement of the workpiece 14 in the one or more workpiece placeable areas, by reference to the above-described placement list 94.

Figure 12:
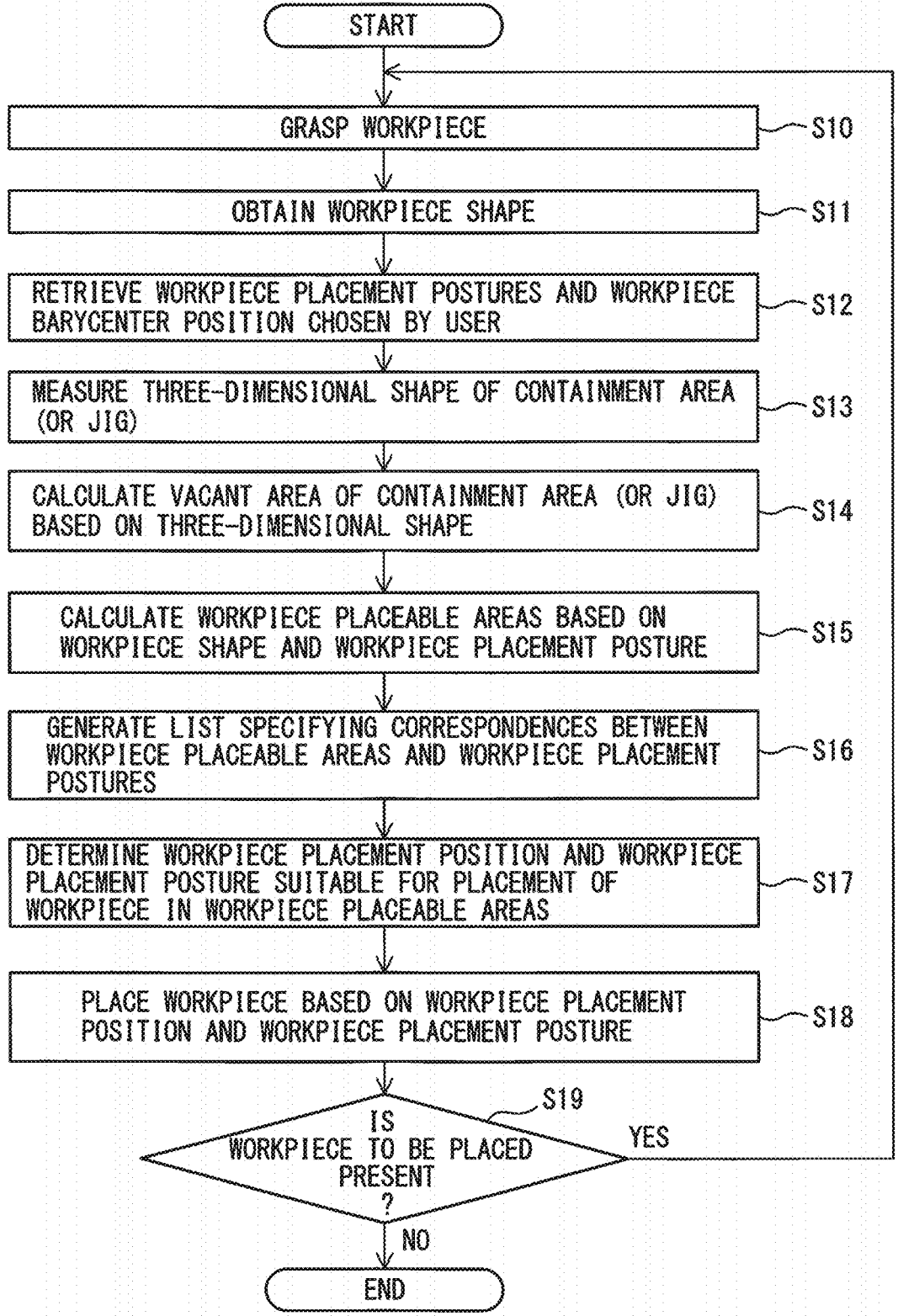
FIG. 12 is a flowchart of the operation of the workpiece placement system according to the embodiment.

FIG. 12 is a flowchart of the operation of the workpiece placement system 10 according to the embodiment. Upon starting a process to place a workpiece, in step S10, the robot 12 grasps a workpiece 14. In step S11, a workpiece shape is obtained from the sensor 13 or the storage unit 90. In step S12, workpiece placement postures and a workpiece barycenter position that are chosen by a user are retrieved from the storage unit 90. In step S13, a three-dimensional shape of the containment area 11 is obtained from the sensor 13. In step S14, a vacant area of the containment area 11 is calculated based on the three-dimensional shape of the containment area 11. In step S15, workpiece placeable areas are calculated based on the workpiece shape and the workpiece placement postures chosen by the user.

In step S16, a placement list 94 that specifies correspondences between the calculated workpiece placeable areas and the one or more types of workpiece placement postures chosen by the user may be generated. In step S17, a workpiece placement position and a workpiece placement posture that are suitable for placement of the workpiece 14 are determined in the workpiece placeable areas. In step S18, the workpiece 14 is placed based on the determined workpiece placement position and workpiece placement posture. In step S19, it is determined whether there is another workpiece to be placed. If another workpiece to be placed is present (YES in step S19), steps S10 to S18 are repeated. If another workpiece to be placed is absent (NO in step S19), the process is ended.

Figure 13A:
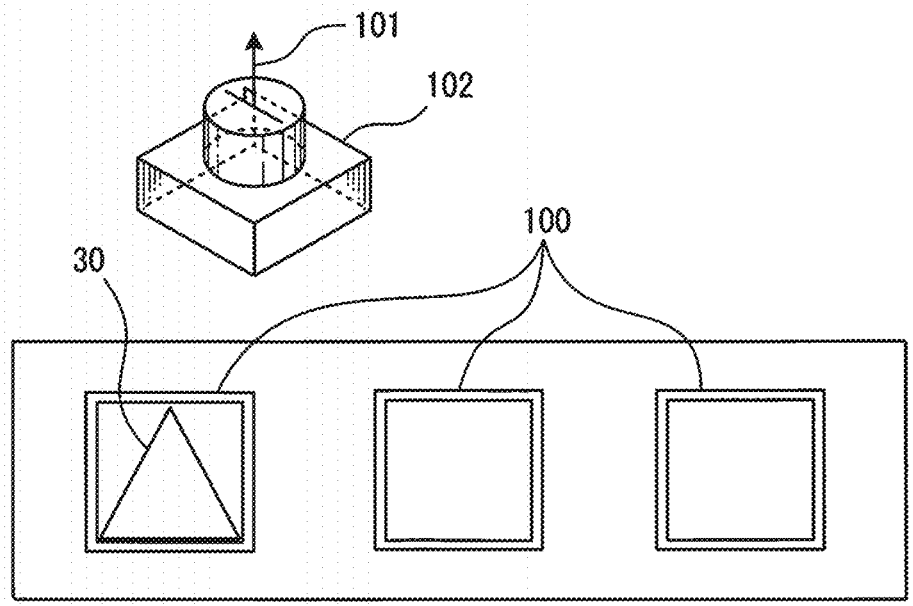
FIG. 13A is a plan view showing jigs according to another embodiment.
Figure 13B:
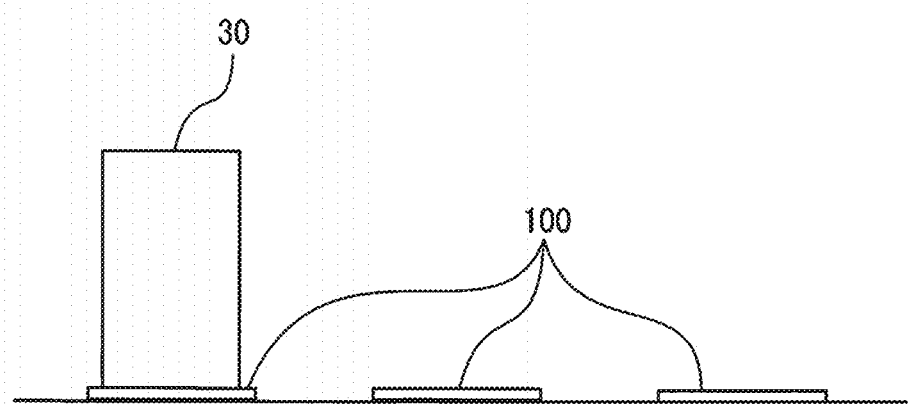
FIG. 13B is a side view showing the jigs according to the other embodiment.

Next, a method for placing a workpiece according to another embodiment will be described. FIGS. 13A and 13B are a plan view and a side view that show three-dimensional shapes of jigs 100 according to the embodiment. By way of example, in a state that a workpiece 30 is already placed on one of the rectangular jigs 100, a workpiece 102 is placed on another of the jigs 100 in a workpiece placement posture 101 chosen by a user (in such a manner as to orient a protruding portion upward). First, the sensor 13 (see FIGS. 1 to 3) obtains the three-dimensional shapes of the jigs 100 from above.

Figure 14A:
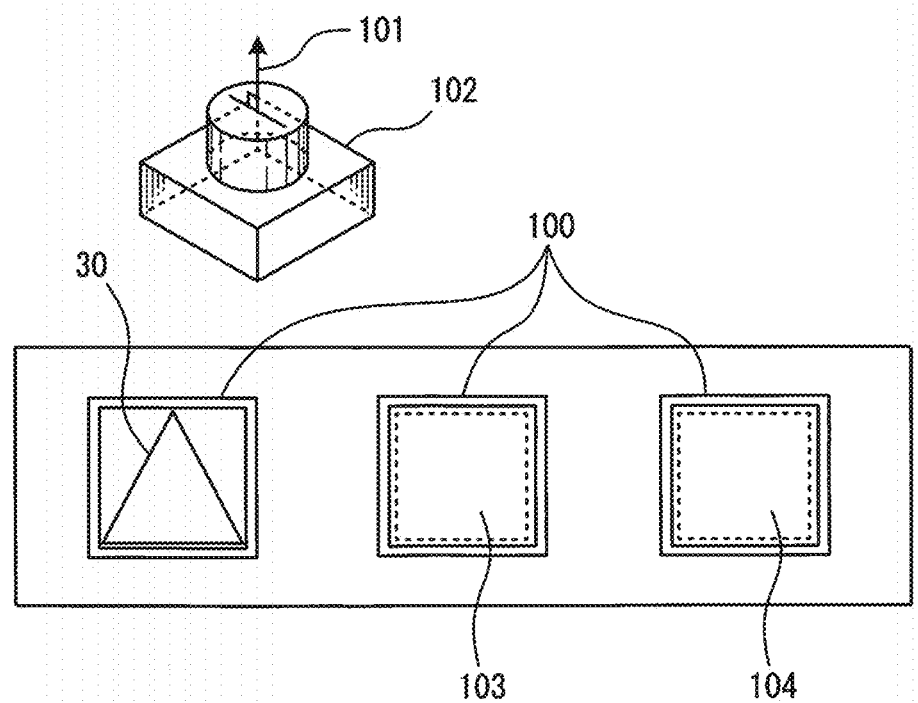
FIG. 14A is a plan view showing vacant areas of the jigs according to the other embodiment.
Figure 14B:
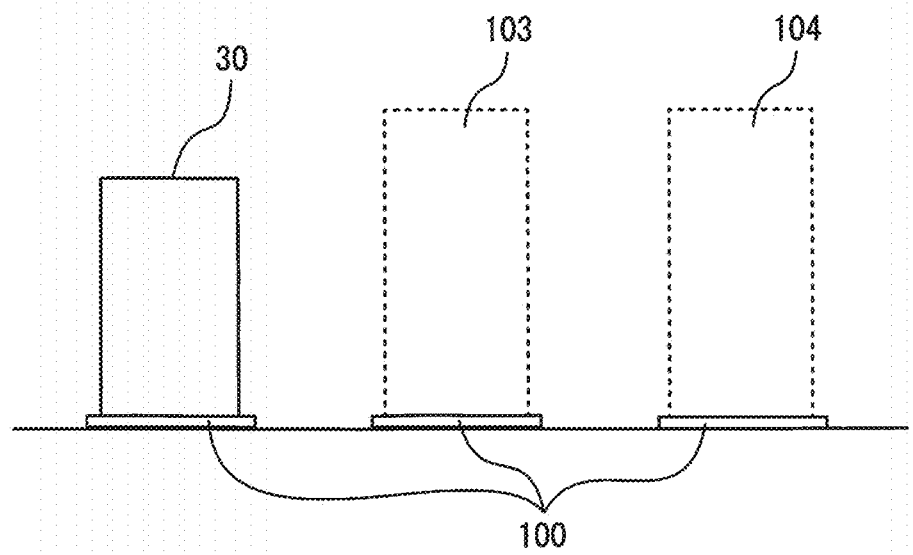
FIG. 14B is a side view showing the vacant areas of the jigs according to the other embodiment.

FIGS. 14A and 14B are a plan view and a side view that show vacant areas 103 and 104 of the jigs 100 according to the embodiment. After the three-dimensional shapes of the jigs 100 are obtained, the vacant areas 103 and 104 of the jigs 100 are calculated.

Figure 15A:
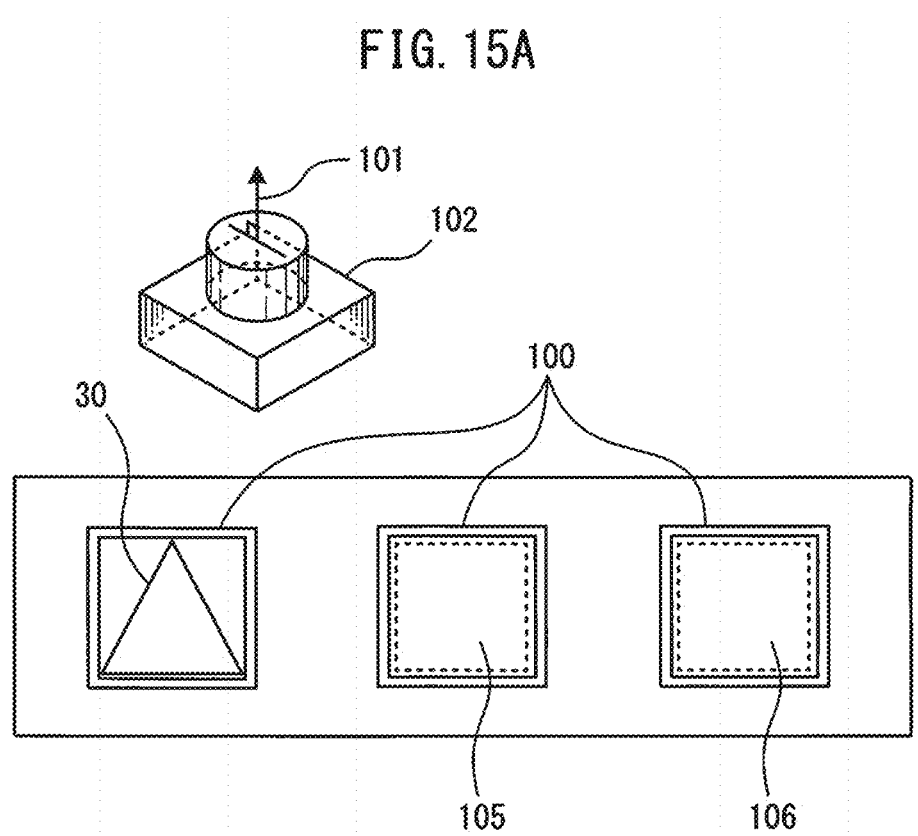
FIG. 15A is a plan view showing workpiece placeable areas according to the other embodiment.
Figure 15B:
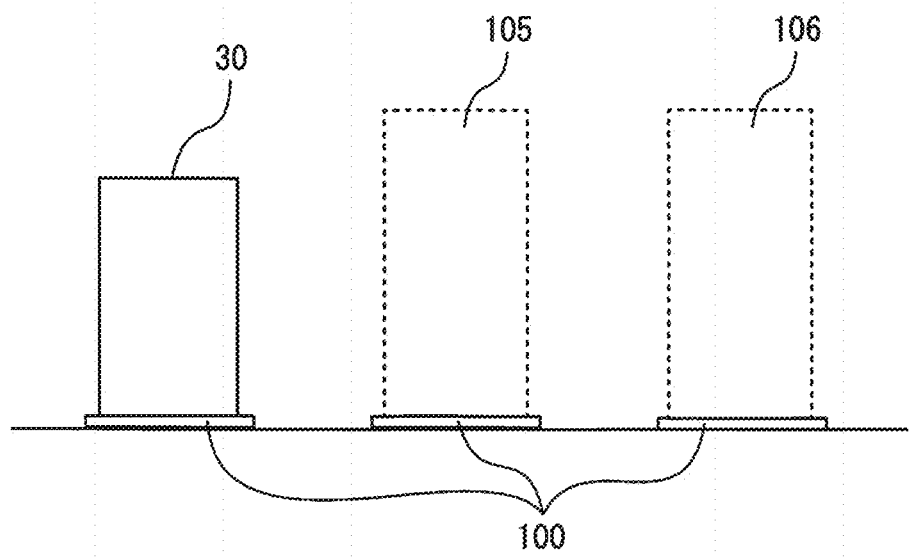
FIG. 15B is a side view showing the workpiece placeable areas according to the other embodiment.

FIGS. 15A and 15B are a plan view and a side view, respectively, that show workpiece placeable areas 105 and 106 according to the embodiment. After the vacant areas 103 and 104 are calculated, the workpiece placeable areas 105 and 106 in which the workpiece 102 can be placed are calculated in the vacant areas 103 and 104. The workpiece placeable areas 105 and 106 are calculated as areas that satisfy the workpiece shape of the workpiece 102 to be placed and the workpiece placement postures 101 chosen by the user, in the vacant areas 103 and 104.

Figure 16A:
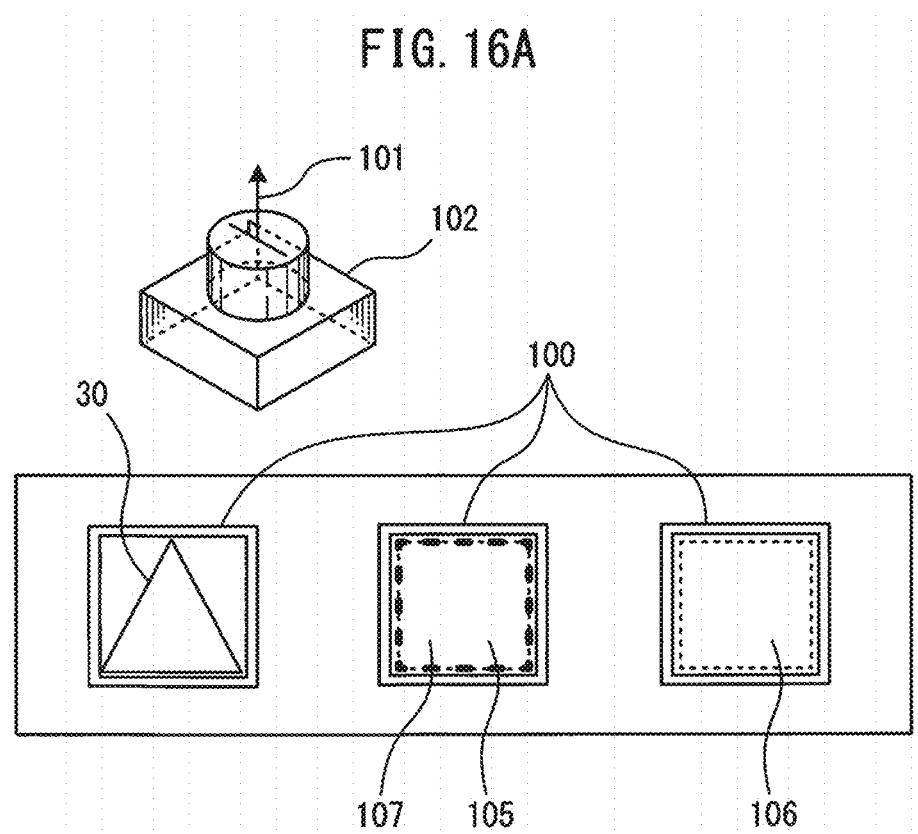
FIG. 16A is a plan view showing a workpiece placement position and a workpiece placement posture according to the other embodiment.
Figure 16B:
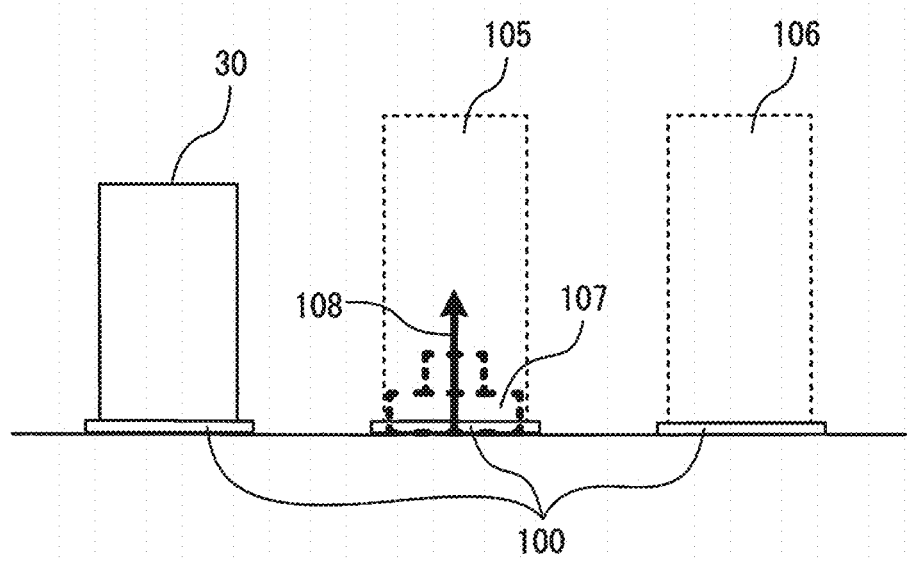
FIG. 16B is a side view showing the workpiece placement position and the workpiece placement posture according to the other embodiment.

FIGS. 16A and 16B are a plan view and a side view, respectively, that show a workpiece placement position 107 and a workpiece placement posture 108 according to the embodiment. After the workpiece placeable areas 105 and 106 are calculated, the workpiece placement position 107 and the workpiece placement posture 108 (indicated by thick lines) suitable for placement of workpiece 102 are determined in the workpiece placeable areas 105 and 106. When the workpiece 30 is already placed, the workpiece placement position and the workpiece placement posture are preferably determined such that the workpiece 102 to be placed is placed in the closest position and posture to the workpiece 30 that is placed in advance.

Figure 17A:
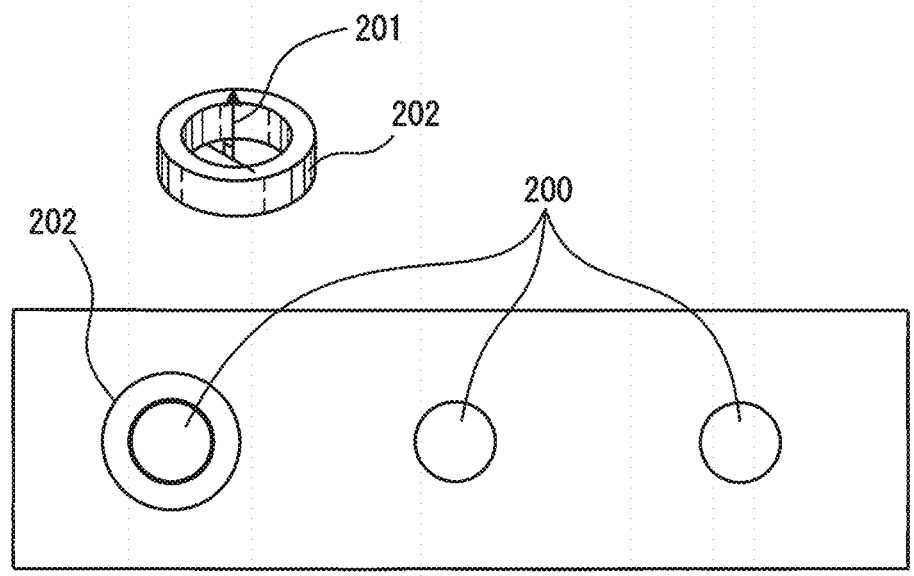
FIG. 17A is a plan view showing jigs according to yet another embodiment.
Figure 17B:
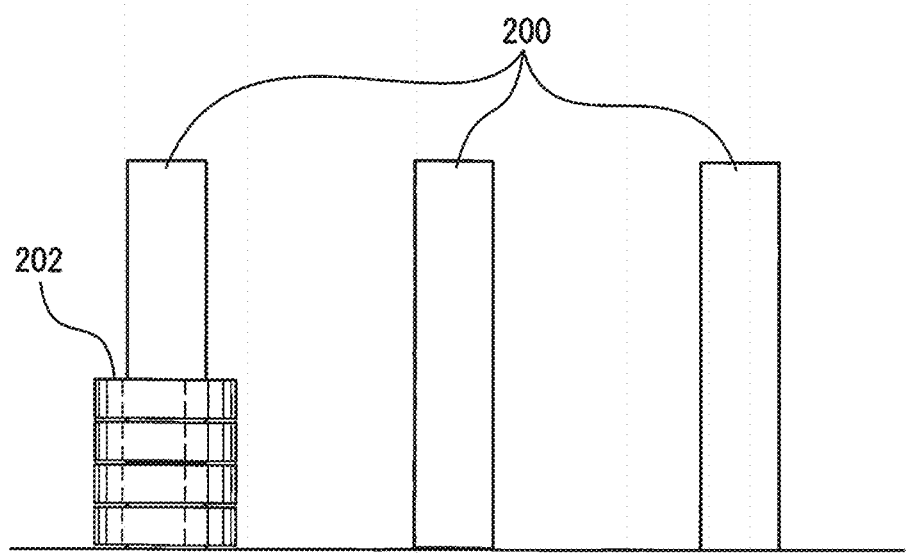
FIG. 17B is a side view showing the jigs according to the yet other embodiment.

Next, a method for placing a workpiece according to yet another embodiment will be described. FIGS. 17A and 17B are a plan view and a side view, respectively, that show jigs 200 according to the embodiment. By way of example, in a state that ring-shaped workpieces 202 are already placed on the jig 200, another ring-shaped workpiece 202 is placed on the jig 200 in a workpiece placement posture 201 chosen by a user (in such a manner as to orient a minor axis in a perpendicular direction). First, the sensor 13 (see FIGS. 1 to 3) obtains three-dimensional shapes of the jigs 200 from above.

Figure 18A:
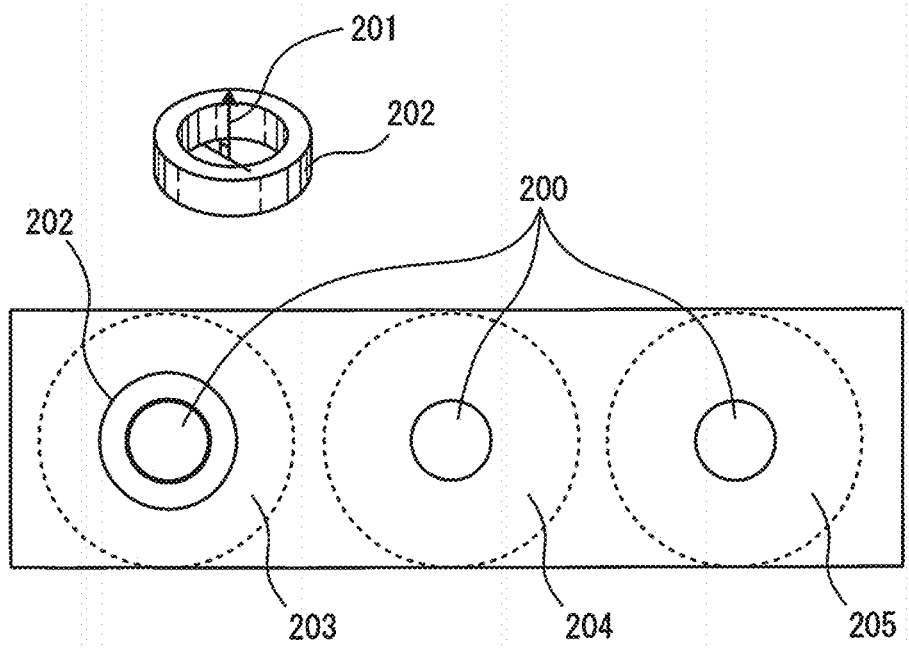
FIG. 18A is a plan view showing vacant areas of the jigs according to the yet other embodiment.
Figure 18B:
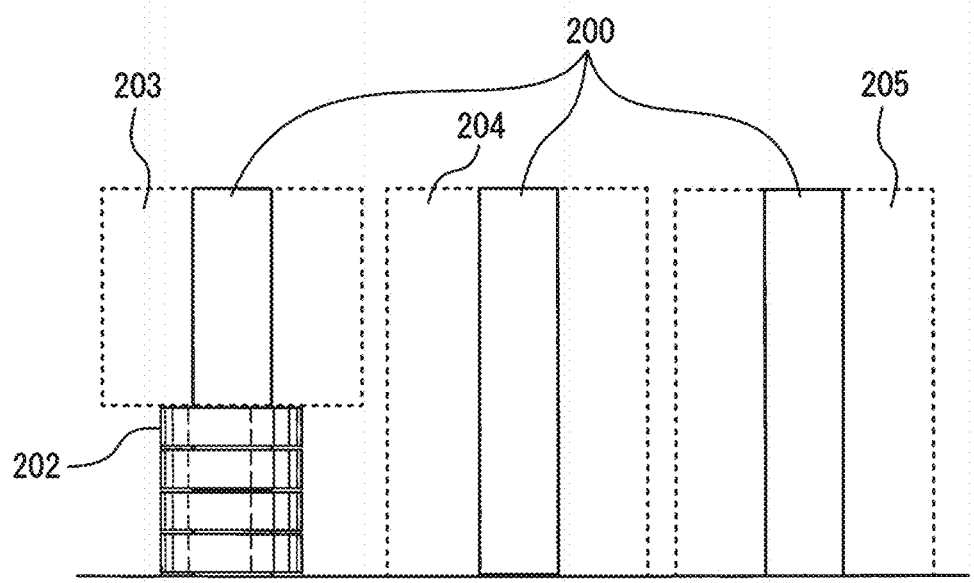
FIG. 18B is a side view showing the vacant areas of the jigs according to the yet other embodiment.

FIGS. 18A and 18B are a plan view and a side view that show vacant areas of the jigs 200 according to the embodiment. After the three-dimensional shapes of the jigs 200 are obtained, the vacant areas 203 to 205 of the jigs 200 are calculated.

Figure 19A:
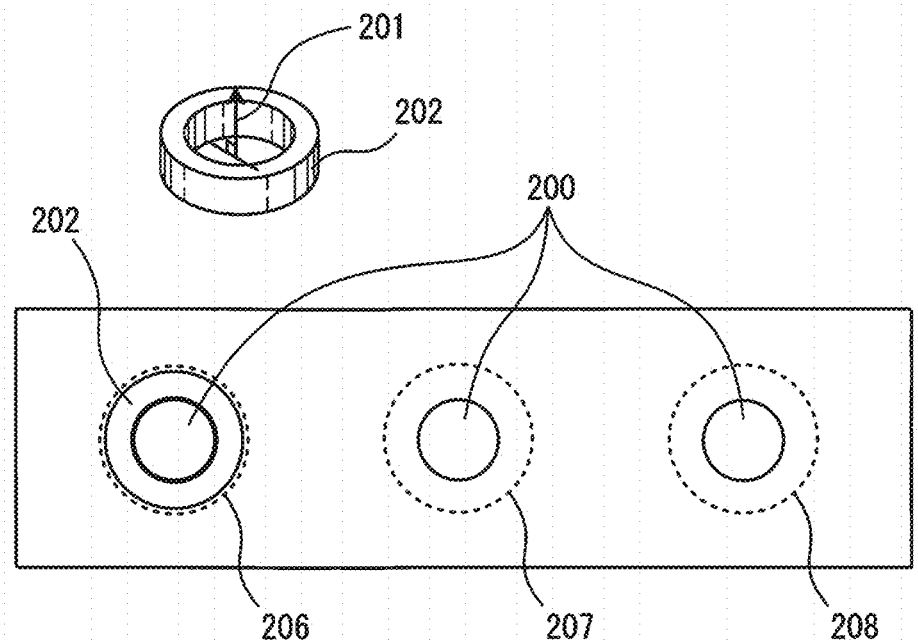
FIG. 19A is a plan view showing workpiece placeable areas according to the yet other embodiment.
Figure 19B:
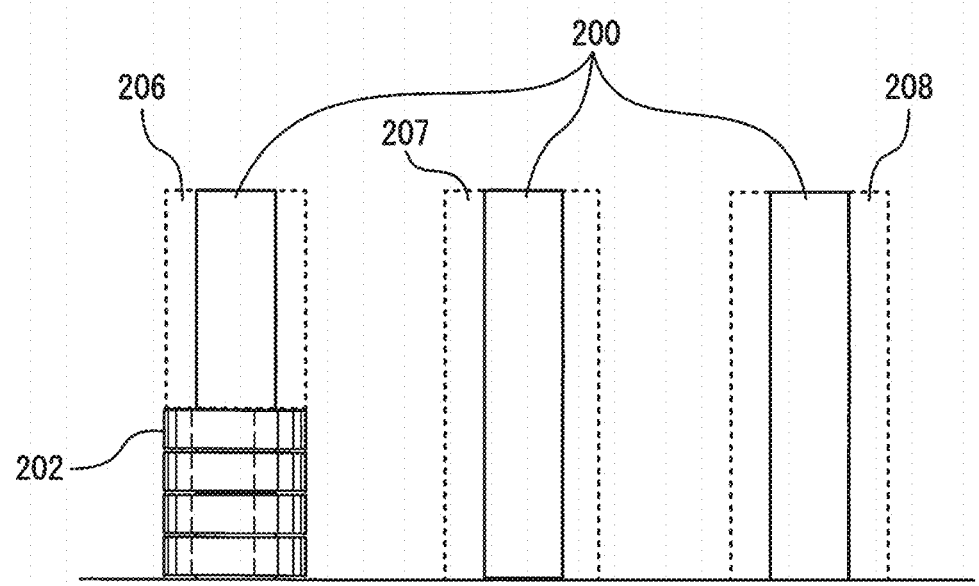
FIG. 19B is a side view showing the workpiece placeable areas according to the yet other embodiment.

FIGS. 19A and 19B are a plan view and a side view, respectively, that show workpiece placeable areas 206 to 208 according to the embodiment. After the vacant areas 203 to 205 are calculated, the workpiece placeable areas 206 to 208 in which the workpiece 202 can be placed are calculated in the vacant areas 203 to 205. The workpiece placeable areas 206 to 208 are calculated as areas that satisfy the workpiece shape of the workpiece 202 to be placed and the workpiece placement posture 201 chosen by the user, in the vacant areas 203 to 205.

Figure 20A:
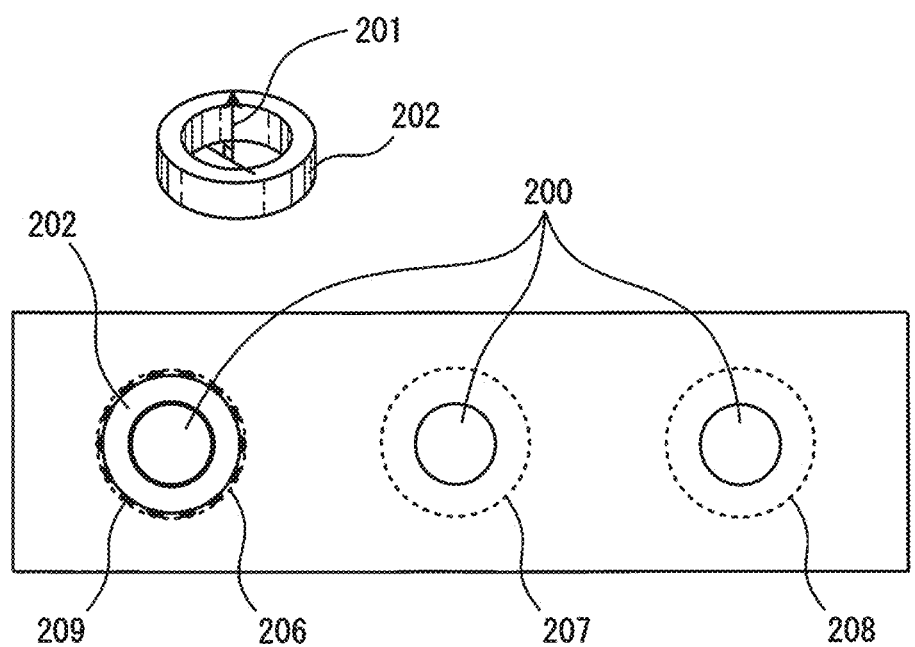
FIG. 20A is a plan view showing a workpiece placement position and a workpiece placement posture according to the yet other embodiment.
Figure 20B:
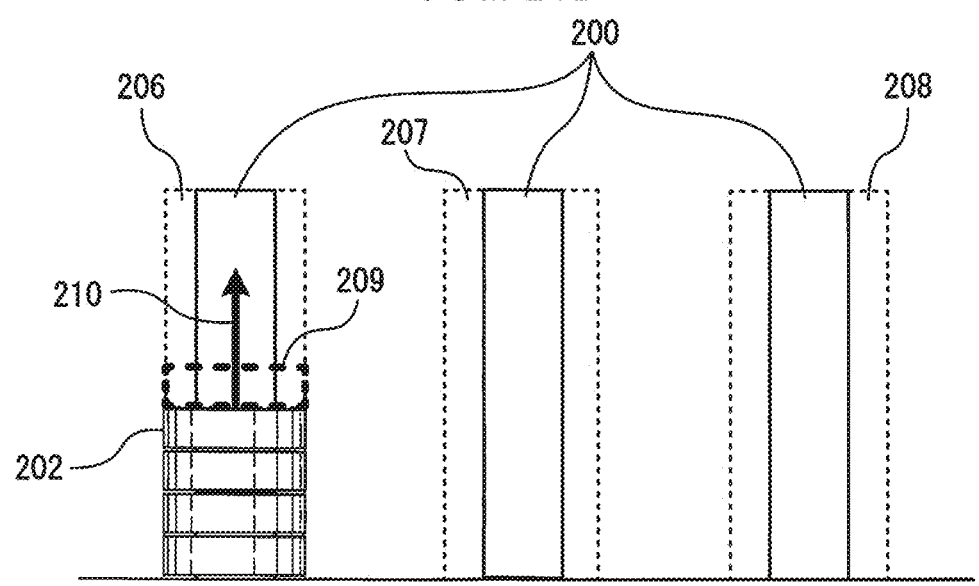
FIG. 20B is a side view showing the workpiece placement position and the workpiece placement posture according to the yet other embodiment.

FIGS. 20A and 20B are a plan view and a side view, respectively, that show a workpiece placement position and a workpiece placement posture according to the embodiment. After the workpiece placeable areas 206 to 208 are calculated, a workpiece placement position 209 and a workpiece placement posture 210 (indicated by thick lines) suitable for placement of the workpiece 202 are determined in the workpiece placeable areas 206 to 208. When the workpieces 202 are already placed, the workpiece placement position and the workpiece placement posture are preferably determined such that the workpiece 202 to be placed is placed in the closest position and posture to the workpieces 202 that are placed in advance.

According to the workpiece placement system of the above embodiments, since the workpiece placement position and the workpiece placement posture are determined based on the workpiece placement postures chosen by the user, the workpiece can be placed in a desired placement posture without any deviation.

A program that is executable by a computer, according to the above embodiments, can be provided in a state of being stored in a computer readable non-temporary recording medium, a CD-ROM, etc. The several embodiments are described in the present application, but the present invention is not limited to the embodiments. The present invention can be variously modified within the scope of claims described below.

The invention claimed is:

1. A workpiece placement system for placing one or more workpieces in one or more containment areas or on one or more jigs comprising:
    a robot for placing the workpiece in the containment area or on the jig;
    a sensor for measuring a three-dimensional shape of the containment area or jig;
    a processor for performing a process to determine a workpiece placement position and a workpiece placement posture based on the three-dimensional shape; and
    a robot controller for controlling the robot based on the workpiece placement position and the workpiece placement posture, wherein
    the processor includes:
    a workpiece shape obtainment section for obtaining a workpiece shape of the workpiece to be placed;
    a placement posture retrieval section for retrieving one or more types of workpiece placement postures chosen by a user;
    a vacant area calculation section for calculating a vacant area of the containment area or jig based on the three-dimensional shape;
    a workpiece placeable area calculation section for calculating one or more workpiece placeable areas that satisfy the workpiece shape and the workpiece placement posture in the vacant area;
    a list generation section for generating a placement list that specifies correspondences between the calculated one or more workpiece placeable areas and the one or more types of workpiece placement postures chosen by the user; and
    a position and posture determination section for determining the workpiece placement position and the workpiece placement posture that are suitable for placement of the workpiece, by reference to the placement list, in the one or more workpiece placeable areas.

2. The workpiece placement system according to claim 1, wherein the position and posture determination section determines the workpiece placement position and the workpiece placement posture in the workpiece placeable area, such that the number or size of contact points, contact lines, and contact surfaces of the workpiece to be placed is maximized.

3. The workpiece placement system according claim 1, wherein the processor further includes a barycenter position retrieval section for retrieving a workpiece barycenter position chosen by the user.

4. The workpiece placement system according to claim 3, wherein the position and posture determination section determines the workpiece placement position and the workpiece placement posture in the one or more workpiece placeable areas, such that a vertical line passing through the workpiece barycenter position is within a contact area formed by the contact points, the contact lines, and the contact surfaces of the workpiece to be placed.

5. The workpiece placement system according to claim 1, wherein the workpieces have one or more types of work shapes.

6. The workpiece placement system according to claim 1, wherein the containment area is a container or a container shelf for containing the workpieces.

7. The workpiece placement system according to claim 1, wherein the jig has a rod shape, and a ring-shaped workpiece is positioned on the jig.

8. The workpiece placement system according to claim 1, further comprising a display unit for displaying alternatives to make the user choose the workpiece placement posture.

9. The workpiece placement system according to claim 8, wherein the alternatives include an item that the workpiece is placed such that a protruding portion of the workpiece shape is oriented upward.

* * * * *